(12) United States Patent
Stuart

(10) Patent No.: US 7,237,335 B2
(45) Date of Patent: Jul. 3, 2007

(54) METHOD TO SERVICE TELECOMMUNICATION BOX

(76) Inventor: John C. Stuart, 10459 E. Hillery Dr., Scottsdale, AZ (US) 85255

( * ) Notice: Subject to any disclaimer, the term of this patent is extended or adjusted under 35 U.S.C. 154(b) by 0 days.

(21) Appl. No.: 11/066,768

(22) Filed: Feb. 25, 2005

(65) Prior Publication Data
US 2005/0188796 A1  Sep. 1, 2005

Related U.S. Application Data

(60) Provisional application No. 60/548,068, filed on Feb. 26, 2004.

(51) Int. Cl.
*H01R 43/04* (2006.01)
(52) U.S. Cl. ............... 29/861; 29/751; 29/758; 29/851; 29/863; 7/107; 72/409.14; 81/438

(58) Field of Classification Search .......... 29/861–868, 29/897.2, 897.3, 897.23, 854, 33 F, 748, 29/750, 751, 758; 7/107, 127, 129; 72/405.12, 72/405.14, 409.16, 409.19; 81/177.4, 438–440, 81/490; 140/105, 106
See application file for complete search history.

(56) References Cited

U.S. PATENT DOCUMENTS

| 4,995,128 | A | * | 2/1991 | Montgomery et al. | ......... 7/127 |
| 5,014,379 | A | * | 5/1991 | Hull et al. | ................ 7/127 |
| 5,450,775 | A | * | 9/1995 | Kozak | .......... 81/440 |
| 6,826,831 | B2 | * | 12/2004 | Crawley | .......... 29/861 |

* cited by examiner

*Primary Examiner*—Minh Trinh
*Assistant Examiner*—Donghai D. Nguyen
(74) *Attorney, Agent, or Firm*—Tod R. Nissle, P.C.

(57) ABSTRACT

A method and apparatus are provided for servicing a telecommunication junction box. The method enables a reduced number of tools to be utilized to service a telecommunication junction box.

1 Claim, 6 Drawing Sheets

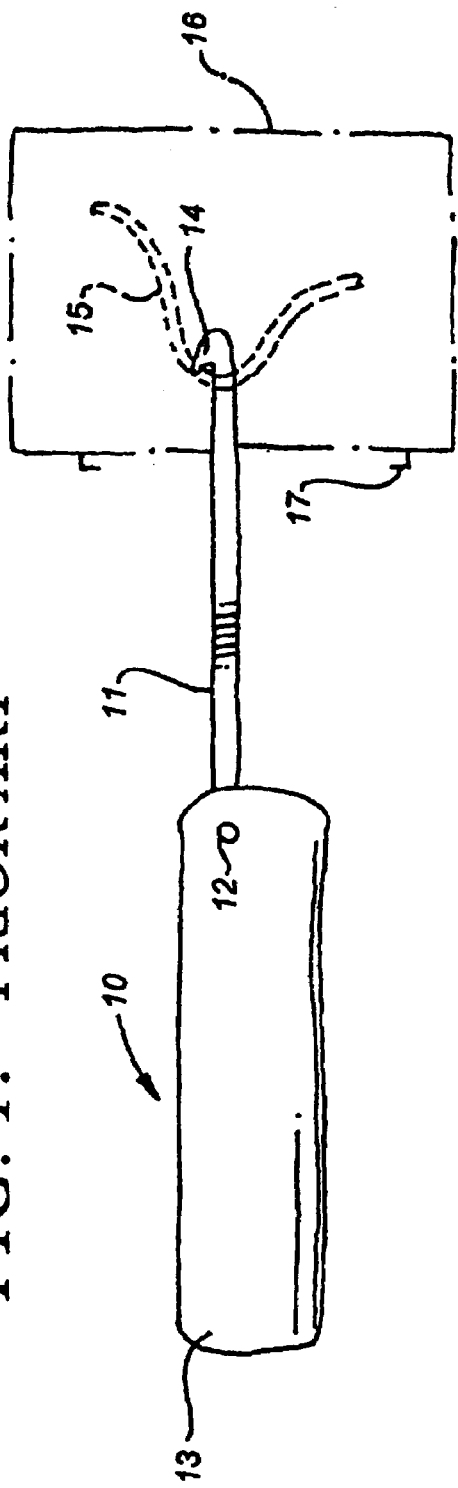
FIG. 1: PRIOR ART

FIG. 2: PRIOR ART
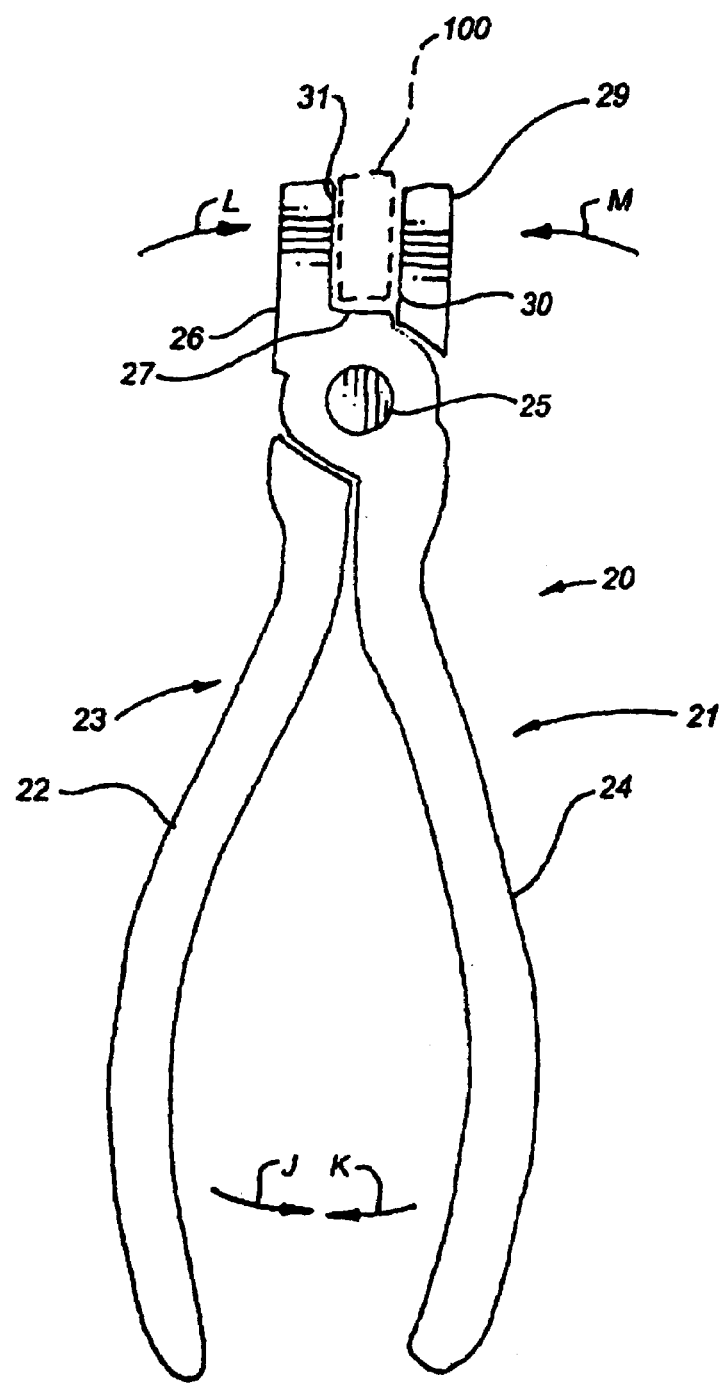

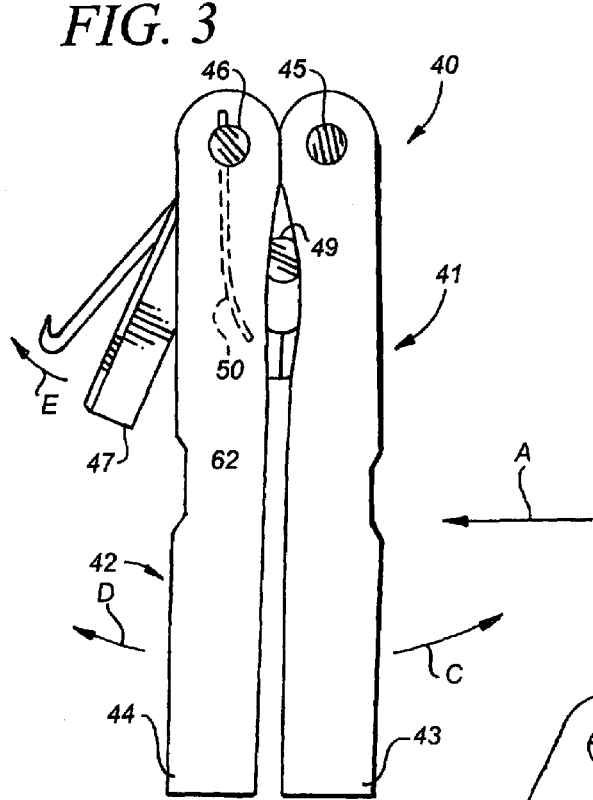
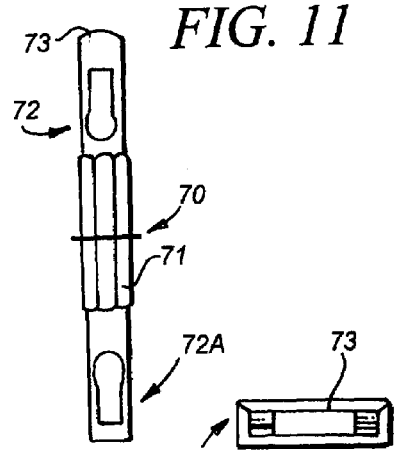
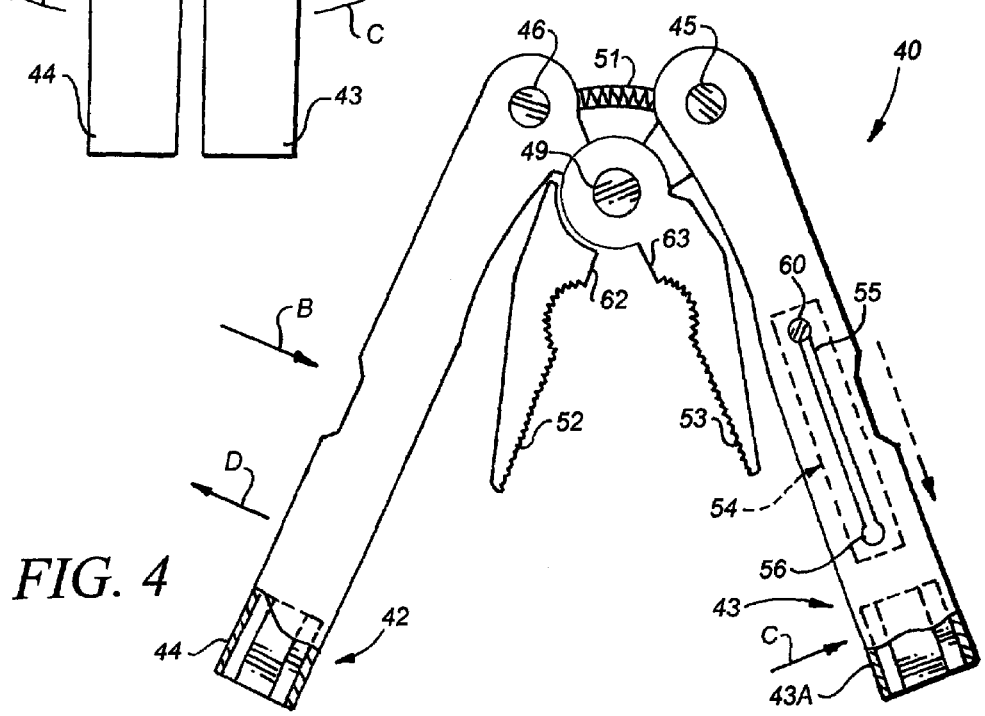

METHOD TO SERVICE TELECOMMUNICATION BOX

This application claims priority based on provisional patent application 60/548,068, filed Feb. 26, 2004.

BACKGROUND OF THE INVENTION

1. Field of the Invention

This invention relates to methods and apparatus for servicing a telecommunication junction box having a plurality of fasteners, wires and electrical connections.

More particularly, the invention relates to a method and apparatus for accessing and crimping a wire in a telecommunications junction box.

2. Description of Related Art including disclosed under 37 CFR 1.97 and 1.98.

Telephone systems in the United States and other countries entail the use of relatively complex wiring. Telecommunication housings or junction boxes which contain many strands of telephone wires are placed in cities, towns and suburbs throughout the United States. Telephone company technicians open these junction boxes and connect, disconnect, crimp, cut, punch down, and otherwise manipulate the wire housed in the boxes. Each wire typically includes an electrically insulative coating except at points along the wire which are stripped to expose the bare metal wire.

Telecommunication junction boxes have a variety of names, including cross box, ready access point, pedestal, wall terminal, SNI (standard network interface box on the sides of homes), and demarcation point (typically in large buildings). Wires in the junction boxes typically are attached to binding posts, punch down blocks, screw terminals, or other electric terminals.

A large incoming feeder line with fifty pairs of wires connects to the pedestal. A plurality of smaller outgoing buried service lines extend from the pedestal to a plurality of homes or other building structures. Each buried service wire includes in its center two to six pairs of wires. Each pair of wires serves as one telephone line. A buried service wire extends from a pedestal to the SNI in a telecommunication box. The SNI (standard network interface) is the demarcation point at which telephone company service lines end and connect to telephone lines or wiring in a home or other building structure.

The two to six pairs of wire in each buried service wire are surrounded by a rubber insulator. The rubber insulator is surround by a layer or jacket of wound copper. The jacket further protects the two to six pairs of wire and serves as an electrical ground. Another layer of insulation is formed over the copper jacket to protect the copper. At times, it is necessary for a telephone repairman to cut through the layer of insulation formed over the copper jacket.

When a telephone company technician is accessing through a junction box door 17 a wire 15 in the junction box 16, he can use the tool 10 illustrated in FIG. 1. Tool 10 includes handle 13 and neck 11 pivotally attached to handle 13 by pin 12. The distal end of handle 11 includes hook 14. The technician uses hook 14 to engage wire 15 and pull wire 15 free from a bundle or group of other wires in box 16. Hook 14 may be utilized to pull a second wire (third wire, etc.) out from a bundle or group of wires. A wire cutter can be utilized to cut the wire 15 in half, if desired.

A "button" 100 can be utilized to crimp or "splice" together two or more wires. A variety of crimping or splicing buttons are known in the art. By way of example, 3M Company produces various SKOTCHLOK(™) connectors which are used to splice together wires without having to strip off and remove the insulation from the wires at the points at which the wires are being spliced.

The tool 20 shown in FIG. 2 is typically used to squeeze, or crimp, a button 100 inserted between gripping members 26 and 29. Handles 22 and 24 are manually displaced about pivot point 25 in the direction of arrows J and K to displace members 26 and 29 in the direction of arrows L and M to crimp button 100.

The foregoing procedure for manipulating wire in a telecommunication junction box has, along with other procedures, been used many times by telephone technicians. One disadvantage of such procedures is that they each require separate tools. This requires a telephone technician to pick up, manipulate, and put down several tools while attempting to manually hold on to and manipulate one or more wires. It would be highly desirable to provide an improved method and apparatus for crimping, splicing, or otherwise manipulating wires. One approach for minimizing the number of tools required by a telephone technician is set forth in U.S. Pat. No. 6,826,831 to Crawley. The approach set forth in the Crawley patent still, however, requires the use of at least two tools. It would be desirable to provide a single tool that would enable a telephone technician to perform many tasks.

In addition to a crimping tool 20, other tools typically carried by a telephone technician include needle nose pliers, can wrench, a screwdriver with a small flat head, a screwdriver with a large flathead, a sni tool, a Phillips screwdriver with a "star" head, a pair of scissors, a sheath or cable knife, a flashlight, a punch down, bits utilized in the punch down, a wire pick, and a can of dog spray (not shown).

One kind of bolt that is incorporated in and that is operated to open and close access doors in a telecommunication junction box has a head including an aperture with an internal hex surface and a dimple formed in the bottom of the aperture. A sni tool is used to engage and turn this kind of bolt. The sni tool includes an external hex surface shaped to conform to and be slidably inserted in the hex surface of the bolt. The distal tip of sni tool includes a detent shaped and dimensioned to conform to and fit over the dimple.

A conventional can wrench is operated by a telecommunication technician by utilizing internal hex surfaces at either end of the can wrench to loosen and tighten hex nuts.

Therefore, it is a principal object of the instant invention to provide an improved method and apparatus for servicing a telecommunication junction box.

A further object of the invention is to provide a single tool that can be utilized by a technician to accomplish servicing of a telecommunication junction box.

BRIEF DESCRIPTION OF THE SEVERAL VIEWS OF THE DRAWINGS

These, and other and further and more specific objects of the invention, will be apparent to those skilled in the art based on the following description, taken in conjunction with the drawings, in which:

FIG. 1 is a side view illustrating a prior art tool for engaging and moving a wire in a telecommunication junction box;

FIG. 2 is a front elevation view illustrating a prior art tool for compressing a button used to splice or crimp wires;

FIG. 3 is a front view illustrating a multipurpose telecommunication tool constructed in accordance with the invention and in a closed orientation;

FIG. 4 is a front view further illustrating the tool of FIG. 3 being manipulated from the closed orientation of FIG. 3 to spread the handles and open the needle nosed pliers incorporated in the tool;

FIG. 11 is a side view illustrating still another tool bit utilized in the tool of FIG. 8; and, FIG. 12 is a top view of the tool bit of FIG. 11.

BRIEF SUMMARY OF THE INVENTION

Briefly, in accordance with the invention, I provide an improved method of servicing a telecommunication box. The box includes at least one door; a bolt with an internal hex surface and a dimple and mounted in the door to open and close the door; a plurality of electrical connectors; and, a plurality of wires each connected to at least one electrical connector. The improved method comprises the steps of providing a crimping button; and, providing a first manually operated telecommunication box tool. The tool includes a pair of handles pivotally connected and each including a distal end and a proximate end; a wire manipulating member at the proximate end operatively opposed to the wire manipulating member at the proximate end of the other one of said pair of handles; a sni tool mounted on one of the handles and movable between at least two operative positions, a first stored operative position, and a second deployed operative position. The method also comprises the steps of moving the sni tool to the deployed position; utilizing the sni tool to open the door to the telecommunication box; and, manually manipulating at least one wire in the telecommunication box with the wire manipulating members.

In another embodiment of the invention, I provide an improved manually operated telecommunication box tool. The tool includes a pair of handles pivotally connected and each including a distal end and a proximate end; a first wire manipulating member at the proximate end of one of the handles; a second wire manipulating member at the proximate end of the other of the handles and operatively opposed to the first wire manipulating member; and, a hex surface formed in the distal end of at least one of the handles and shaped and dimensioned to engage a hex shaped nut used to open and close a door in a telecommunication box.

In a further embodiment of the invention, I provide an improved manually operated telecommunication box tool. The tool includes a pair of handles pivotally connected and each including a distal end and a proximate end; a first wire manipulating member at the proximate end of one of the handles; a second wire manipulating member at the proximate end of the other of the handles and operatively opposed to the first wire manipulating member; and, a tool slidably mounted on one of the handles and movable between at least two operative positions, a first stored operative position, and a second deployed operative position.

DETAILED DESCRIPTION OF THE INVENTION

Figure 5:
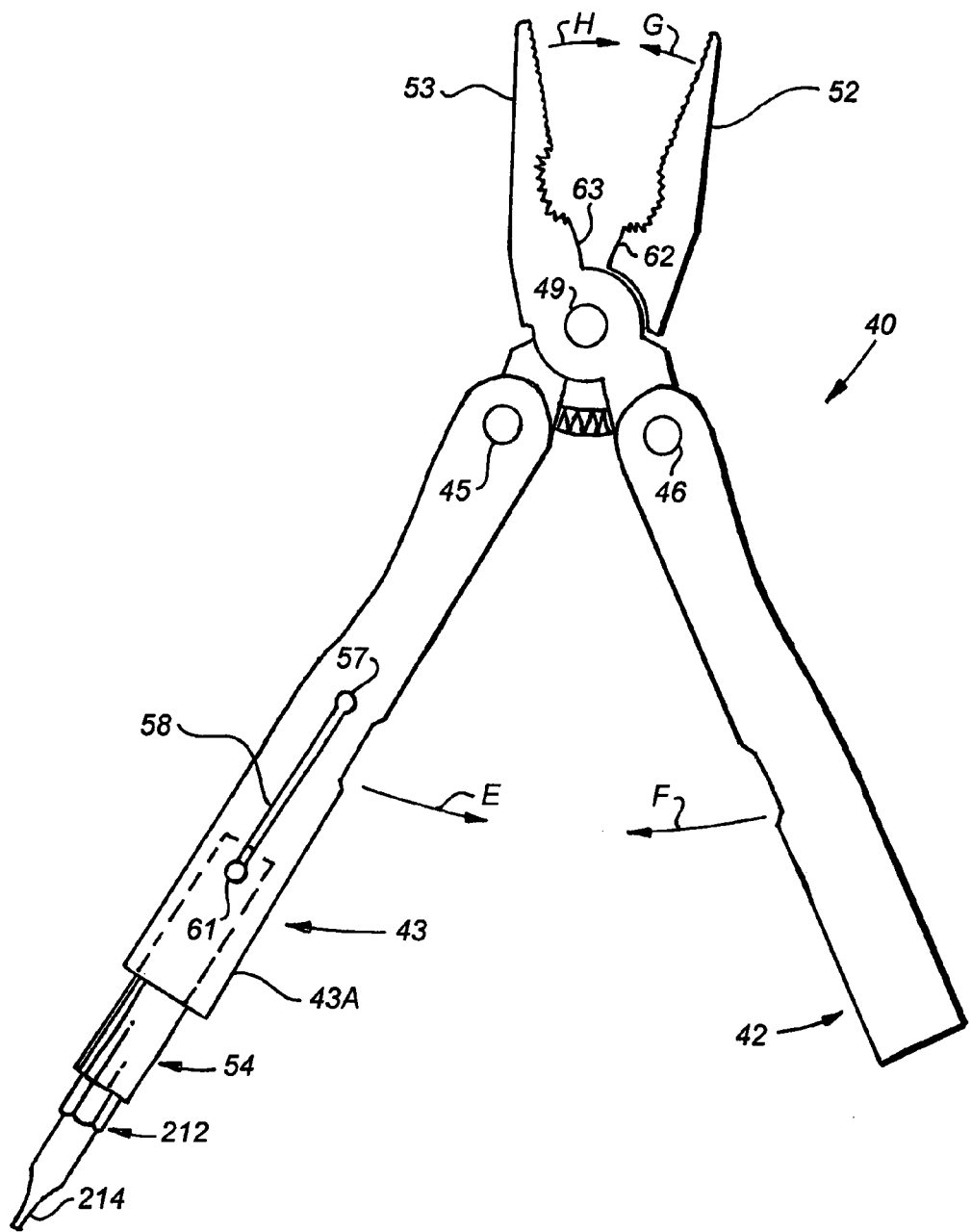
FIG. 5 is a front elevation view illustrating the tool of FIG. 3 after it is manipulated to open the needle nosed pliers.

Turning now to the drawings, which describe the presently preferred embodiments of the invention for the purpose of describing the operation and use thereof and not by way of limitation of the scope of the invention, and in which like reference characters refer to corresponding elements throughout the several views, FIGS. 3 to 5 illustrate a tool 40 constructed in accordance with the principles of the invention and including gripping needle-nose members 52 and 53 and hollow handles 42 and 43. In order to use members 52 and 53, handles 42 and 43 are manually pivoted about the pins 46 and 45, respectively, in the direction of arrows C and D to displace handles 42 and 43 to the position shown in FIG. 5. When handles 42 and 43 are in the storage position of FIG. 3, needle-nose wire manipulating members 52 and 53 are housed in handles 42 and 43, respectively, against stops 50 and 50A, respectively.

When tool 40 is in the storage orientation of FIG. 3, hook 48 and/or cutting blade 47 can be pivotally moved from their storage position in handle 42 to a deployed position in which hook 48 and/or blade releaseably lock (like the blades of many pocket knives) and that enables hook 48 and/or blade 47 to be utilized. If desired, hook 48 and blade 47 can be pivoted in the direction of arrow E until each is located on top of handle 42 in FIG. 3 and is generally parallel to the longitudinal axis of handle 42. Handles 42 and 43 are then grasped with one hand of a user and are manipulated to move hook 48 and/or blade 47 in a desired manner.

If desired, tool 40 can be fabricated with crimping jaws 26, 29 substituted for needle nose members 52, 53. Or, wire manipulating members 52 and 53 can be shaped and dimensioned to pull, cut, crimp, or perform any other desired function or functions with respect to manipulating wires in a telecommunications box. Member 52 includes cutting edge 62. Member 53 includes cutting edge 63. When tool 40 is in the storage orientation of FIG. 3, edges 62 and 63 currently overlap, but need not do so.

In FIG. 5, grasping handles 42 and 43 and displacing them toward one another in the direction of arrows E and F causes members 53 and 52 to pivot about pin 49 in the direction of arrows of arrows H and G, respectively. Spring 51 generates expansion forces that function to maintain members 52 and 53 open or spaced apart in the position illustrated in FIG. 5.

A cutting edge 62, 63 is formed in each of members 46, 49. When members 46,49 are closed as illustrated in FIG. 3, edges 62, 63 overlap one another. Edges 62 and 63 are used to cut a piece of wire by placing the wire between edges 62 and 63 when members 52 and 53 are opened to the position shown in FIG. 5 and by then manually pressing handles 42 and 43 in the direction of arrows E and F to squeeze edges 62, 63 through the wire to cut the wire into two pieces.

The lower end 44 of hollow handle 42 includes, as shown in FIG. 4, an inner surface shaped and dimensioned to slidably fit over a standard $\frac{3}{8}$ inch wide nut such that handle 42 can be rotated to turn the nut and open a telecommunication box door on which the nut is mounted. Similarly, the lower end 43A of handle 43 includes an inner surface shaped and dimensioned to slidably fit over a standard $\frac{7}{16}$ inch wide nut such that handle 43 can be rotated to turn the nut and open a telecommunication box door on which the $\frac{7}{16}$ inch nut is mounted. Lower ends 43A, 44 can be shaped and dimensioned in any desired manner as long as they perform the function of engaging a nut or other component on a telecommunication box door such that the nut can be operated by manipulating tool 40 to open (or close) the door.

Hollow tool 54 is slidably mounted in handle 43. Tool 54 includes aperture 232A. The upper or outer end 233 of aperture 232A includes an internal approximately 5/16 wide hex surface. This hex surface is slightly wider than the remaining portion of aperture 232A, producing neck or ledge 232D.

Figure 8:
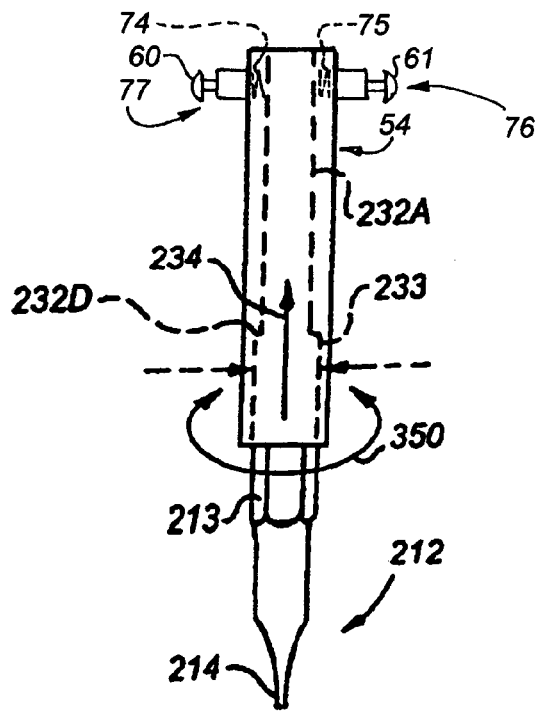
FIG. 8 is a side view illustrating the mode of operation of a tool incorporated in one handle of the tool of FIG. 3.
Figure 9:
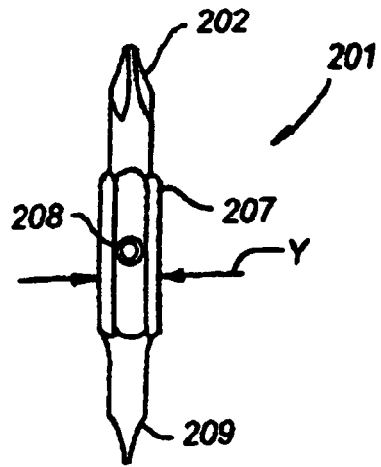
FIG. 9 is a side view illustrating a tool bit utilized in the tool of FIG. 8.

Bit 201 includes Phillips tip 202, small flat head screwdriver tip 209, external hex surface 207 having a width indicated by arrows Y and shaped to slidably insert into the hex surface formed in end 233, and spring loaded ball bearing 208 that bears against the hex surface in end 233 when bit 201 is inserted in tool 54 in the same manner that tool 212 is inserted in tool 53 in FIG. 8.

Bit 212 includes sni tool 215 with tip 216, large flat head screwdrivertip 214, external hex surface 213 having a width indicated by arrows 211 and shaped to slidably insert into the hex surface formed in end 233, and spring loaded ball bearing 215 that bears against the hex surface formed in end 233 when bit 212 is inserted in barrel 204 to the position illustrated in FIG. 8.

Figure 10:
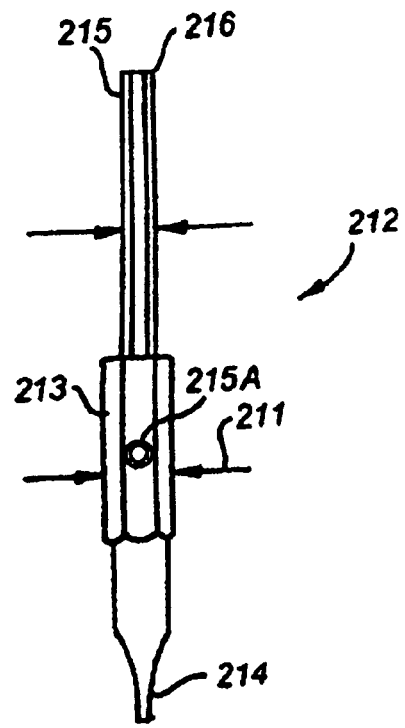
FIG. 10 is a side view illustrating another tool bit utilized in the tool of FIG. 8.

Bit 201 can be inserted in aperture 233 such that tip 209 extends outwardly from aperture 233 and is visible, or, bit 201 can be inverted and inserted in aperture 233 such that tip 202 is visible and tip 209 is inside aperture 233 and is not visible. When bit 212 is inserted in aperture 233 in the direction of arrow 234, hex surface 213 contacts ledge 232D to halt the travel of bit 212 in the direction of arrow 234 such that bit 212 is seated in aperture 233 with tip 214 in the position shown in FIG. 8 (or with sni tool 215 in a comparable position in the event bit 212 is inverted from the position shown in FIG. 10 and is inserted in aperture 233).

The tools or tips provided on a bit 201, 212 can be varied as desired, or additional bits can be provided. For example, in bit 201, end 202 can be a flathead screwdriver tip instead of a Phillips screwdriver tip, end 209 can be a sni tool instead of a flathead screwdriver tip, etc.

Hex surface 207, 213 is slidably received by the hex surface formed in the end 233 such that bit 201, 212 is prevented from rotating in aperture 233 of tool 54 in the directions indicated by arrows 350.

Figures 6, 7:
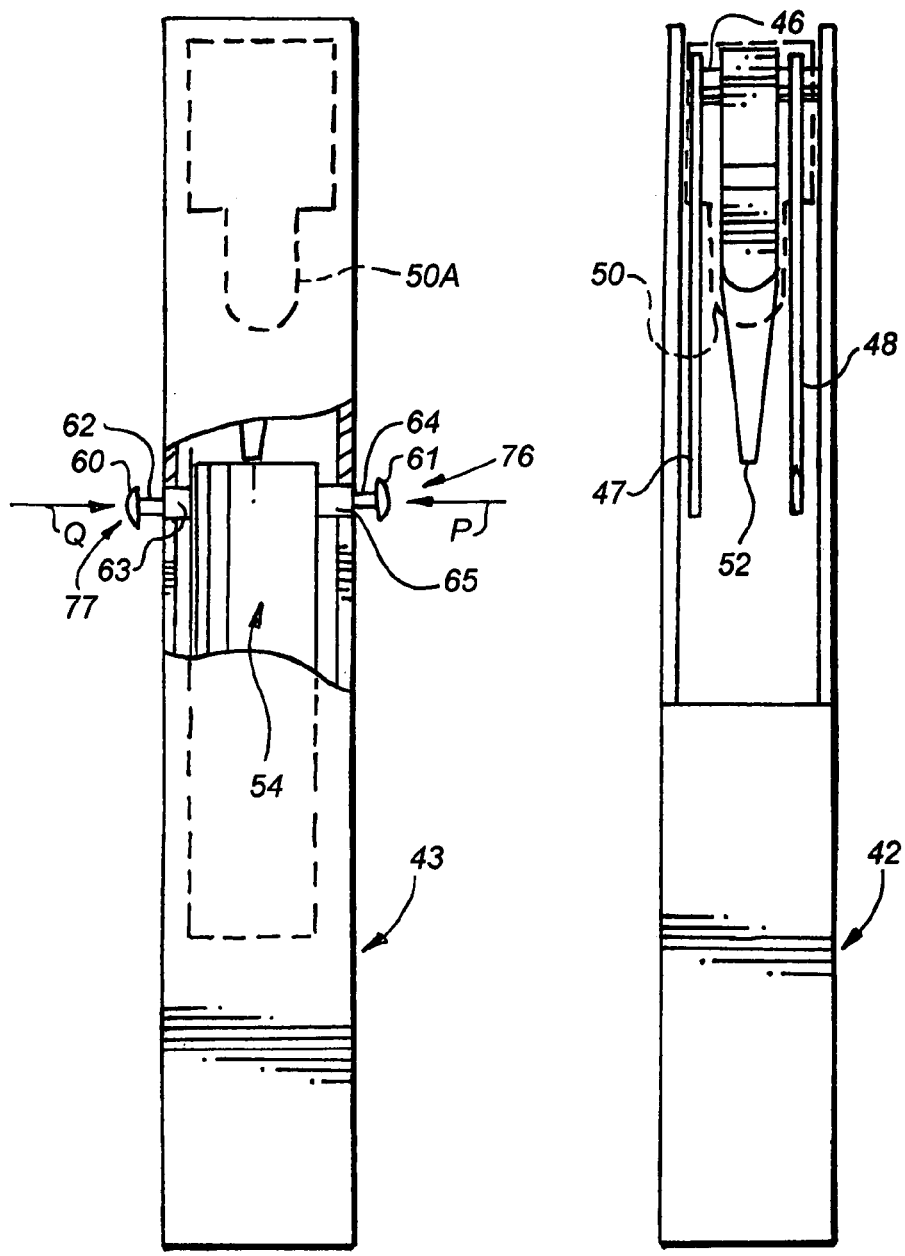
FIG. 6 is a side view illustrating one of the handles of the tool of FIG. 3.
FIG. 7 is a side view illustrating another of the handles of the tool of FIG. 3.

Leg 43 includes a pair of equivalent, parallel, spaced apart, opposed slots 55 (FIG. 4) and 58 (FIG. 5). Slot 55 includes at either end an opening 56 having a diameter greater than the width of slot 55. Slot 58 includes at either end an opening 57 having a diameter greater than the width of slot 58. A pair of spring loaded pins 76, 77 are mounted on the upper end of tool 54. Pin 76 includes head 61, neck 64, and body 65. Pin 77 includes head 60, neck 62, and body 63. Spring 75 (FIG. 8) acts outwardly against and maintains pin 76 in the position illustrated in FIGS. 6 and 8. Spring 74 acts outwardly against and maintains pin 77 in the position illustrated in FIGS. 6 and 8. When tool 54 is in the stored position illustrated in FIGS. 4 and 6, the body 63, 65 of each pin is seated in the opening 57 at the top of each slot 58, 55, respectively. Tool 54 is moved from the stored position of FIGS. 6 and 8 to the deployed position of FIG. 5 by using the fingers of a hand to squeeze or depress heads 61 and 60 of pins 76 and 77 inwardly in the direction of arrows P and Q to compress springs 75 and 74, respectively, and by simultaneously using the fingers to slide pins 76 and 77 through slots 58 and 55 toward end 43A. Tool 54 moves simultaneously with pins 76, 77. When tool 54 is in the storage position of FIG. 6 and pins 76 and 77 are inwardly depressed in this manner, necks 64 and 62 are positioned in the opening 57 at the top of each slot 58, 55. The diameter of each neck 64, 62 is slightly less than the width of slots 58 and 55, which permits each neck 64, 62 to slide downwardly along its associated slot 58 or 55 to the opening 56 at the bottom or lower end of the slot 58, 55. Once necks 64, 62 are each at the lower end of their respective slot 58 and 55, the user releases the fingers depressing heads 61 and 60 of pins 76 and 77, permitting springs 75 and 74 to expand resiliently and return pins 76 and 77 to the positions illustrated in FIGS. 6 and 8. When pins 76 and 77 are in the positions shown in FIG. 5, the body 65, 63 of each pin is in the opening 56 at the bottom end of the slot. The diameter of the body 65, 63 of each pin 76, 77 is slightly less than that of opening 56 and is greater than the width of slot 58, 55. Consequently, when a pin body 65, 63 is in an opening 56, 57, the tool is secured in place and can not be slid from the stored to the deployed position, or vice versa, until pins 76 and 77 are inwardly depressed P, Q to position necks 64 and 62 in an opening 56, 57. When tool 54 is in the deployed position illustrated in FIG. 5, a bit 201, 212 can be inserted in or removed from tool 54 in the manner earlier described. An alternate bit 70 that can be utilized in tool 54 is illustrated in FIGS. 11 and 12 and is called a punch down bit. The bit 70 includes a central hex section 71 comparable to the hex sections 207 and 213 found in bits 201, 212. Bit 70 includes at least one hollow punch down end 72. End 72 includes a cutting edge 73. The alternate end 72A also comprises a hollow punch down, but the punch down in end 72A does not include a cutting edge. A variety of punch down tool configurations are known and can be utilized in a bit 70. FIG. 6 is a side view of handle 43 taken from the side indicated by arrow A in FIG. 3. FIG. 7 is a side view of handle 42 taken from the side indicated by arrow B in FIG. 4.

In use, a telephone technician travels to a selected telecommunication junction box. The technician depresses pins 76 and 77 and moves tool 54 from the stored position of FIG. 4 to the deployed position of FIG. 5. Bit 212 is inserted in tool 54 with the sni tool 215 extending outwardly from tool 54 and end 43A. The technician utilizes handle 43 and sni tool 215 to unthread the bolt or bolts securing one or more doors in a telecommunication junction box. Or, if appropriate, the technician opens one or more doors in a telecommunication box by utilizing one of the hex openings at the end of a handle 42, 43 to turn a nut that secures the door in a closed configuration. After the telecommunication box door is open, the technician can, if appropriate, place one of the internal hex openings at the end of a handle 42, 43 over a hex nut or hex head screw in or on the telecommunication junction box and turn the handle 42, 43 to loosen (or tighten) the nut or screw. The technician can also utilize any of the tips 202, 209, 214 on a bit 201 or 212 (by appropriately installing a bit in deployed tool 54 so the desired tip can be utilized) to install or remove screws or other components from a telecommunication junction box.

The technician grasps tool 40 in the configuration of FIG. 5 (with or without tool 54 deployed from handle 43); reaches inside the junction box with tool 40; maneuvers tool 40 to position a desired wire 15 between members 52 and 53 (this typically requires tapered members 52 and 53 to be pushed into a grouping or bundle of telephone wires, after which handles 42 and 43 are displaced in directions opposite those indicated by arrows E and F to slightly open jaws or members 52 and 53); displaces handles 42 and 43 in the directions of arrows E and F to squeeze and grasp the desired wire 15 between members 52 and 53; pulls the tool 40 to pull the desired wire 15 to a desired location inside or outside of the junction box 16; grasps the wire 15 with one hand (hook 48 can also be deployed in the direction of arrow E and utilized to engage and pull a desired wire in the telecommunications box); deploys blade 47 in the direction of arrow E; uses the other hand to cut one or more wires 15 with tool blade 47 (or cuts wire 15 by placing the wire between open cutting edges 62 and 63 and by displacing handles 42 and 43 in the direction of arrows E and F); grasps one end of the cut wire 15 and slips the end of the cut wire into an opening in a crimping button (or in a punch down or other crimping or splicing device); opens with one hand handles 42 and 43 in directions opposite those indicated by arrows E and F; places with another hand the crimping button intermediate members 52 and 53; and, displaces handles 42 and 43 in the directions indicated by arrows E and F to generate compressive forces against the crimping button to force teeth in the button through the insulation in the end of the wire(s) positioned in the crimping button. If wire 15 is placed in a punch down, bit 70 is inserted in deployed tool 54 and hollow end 72 or 72A, as the case may be, is used in conventional fashion to secure wire 15 in the punch down. In use, hollow end 72 or 72A slides over the punch down and functions to press wire 15 into the groove at the bottom of the punch down. The method of the invention permits a telecommunications technician to find, position, cut, crimp, and/or punch down using a single tool 40.

The tapered configuration of members 52 and 53 is preferred because the distal ends of members 52, 53 must be able to slide into or pierce groups or bundles of wire to grasp a single wire in the bundle.

Sni tools come in different sizes, but each such tool includes a detent to receive a dimple that extends upwardly from the bottom of an internal hex aperture formed in a bolt. As used herein, a pairgain tool is considered to be a sni tool.

Having described my invention in such terms as to enable those of skill in the art to understand and practice it, and having described the presently preferred embodiments and best mode thereof, I claim:

1. A method of servicing a telecommunication box including
   at least one door,
   a bolt with an internal hex surface and a dimple and mounted in the door to open and close the door,
   a nut with an external hex surface,
   a plurality of electrical connectors, and
   a plurality of wires each connected to at least one of the electrical connectors,
said method comprising the steps of
   (a) providing a crimping button;
   (b) providing a first manually operated telecommunications box tool including a pair of hollow handles pivotally connected and each including
      (i) a distal end and a proximate end,
      (ii) a wire manipulating member at the proximate end operatively opposed to the wire manipulating member at the proximate end of the other one of said pair of handles,
      (iii) an internal hex surface (43A) at said distal end of one of said handles,
      (iv) a hollow tool (54) slidably mounted inside said one of said handles and movable between at least two operative positions,
         a first stored operative position in said one of said handles intermediate said distal end and said proximate end of said one of said handles, and
         a second deployed operative position with a portion of said hollow tool extending through said internal hex surface (43A) outwardly from said distal end of said one of said handles,
      (v) a hook (48) pivotally attached to said proximate end and movable between
         at least two operative positions,
         a first stored operative position, and
         a second deployed operative position,
      (vi) a blade (47) pivotally attached to said proximate end and movable between
         at least two operative positions,
         a first stored operative position, and
         a second deployed operative position,
   said tool including a bit (212) having a sni tool at one end, said bit shaped and dimensioned to be, when said hollow tool is in said second deployed operative position of said hollow tool and extending through said internal nex surface, inserted in said hollow tool such that said sni tool extends outwardly away from said hollow tool;
   (c) slidably moving said hollow tool (54) to said deployed position and inserting said bit in said hollow tool such that said sni tool extends outwardly away from said hollow tool;
   (d) utilizing said sni tool to engage said bolt with said internal hex surface to open said the door to the telecommunication box;
   (e) removing said bit (212) from said hollow tool;
   (f) slidably moving said hollow tool from said second deployed operative position to said first stored operative position of said hollow tool;
   (g) utilizing said internal hex surface (43A) to engage the nut with the external hex surface;
   (h) pivotally moving said hook (48) to said deployed position of said hook to engage and pull a desired one of the plurality of wires of the telecommunications box;
   (i) pivotally moving said hook from said deployed position to said stored position of said hook;
   (j) pivotally moving said blade (47) to said deployed position of said blade to cut a desired one of the plurality of wires of the telecommunications box;
   (k) pivotally moving said blade (47) from said deployed position to said stored position of said hook; and,
   (l) manually manipulating with said wire manipulating members a desired one of the plurality of wires of the telecommunication box to compress the crimping button on the end of the desired wire positioned in the crimping button.

* * * * *